United States Patent [19]

Aoki

[11] 4,298,567
[45] Nov. 3, 1981

[54] STRETCHING AND BLOW MOLDING OF SYNTHETIC RESIN BOTTLES WITH BASE CUPS

[76] Inventor: Katashi Aoki, 6037, Ohaza Minamijo, Sakakimachi, Hanishina-gun, Nagano-ken, Japan

[21] Appl. No.: 179,779

[22] Filed: Aug. 20, 1980

[30] Foreign Application Priority Data

Aug. 22, 1979 [JP] Japan ................................ 54-106913

[51] Int. Cl.³ ........................ B29C 17/07; B29D 3/00
[52] U.S. Cl. .................................... 264/516; 264/532; 425/503; 425/525
[58] Field of Search ............... 264/516, 523, 532, 531, 264/534, 513; 425/503, 525; 156/293

[56] References Cited

U.S. PATENT DOCUMENTS 3,367,809  2/1968  Soloff .............................. 156/293 X
3,898,310  8/1975  Schiemann ..................... 425/503 X
4,225,375  9/1980  Aidlin et al. .................... 156/293 X Primary Examiner—Jan H. Silbaugh
Attorney, Agent, or Firm—Lawrence A. Maxham

[57] ABSTRACT

Synthetic resin bottles with base cups are prepared by stretching a parison with a bottom having a sprue at its bottom surface, by means of a stretching rod, to the bottom surface of a base cup having a hole at its center, the base cup being mounted on a bottom mold of a blow mold, the bottom mold having a hole larger than the hole of the base cup, in which a pressing jig is mounted for crushing the sprue formed on the bottom of the parison with a bottom; inserting the sprue into the hole in the bottom of the base cup; crushing the sprue by means of the pressing jig to form a rivet; and, at the same time, blowing air into the parison with a bottom so as to press the outer bottom surface of the parison against the inner surface of the base cup to securely adhere one to the other.

2 Claims, 3 Drawing Figures

4,298,567

STRETCHING AND BLOW MOLDING OF SYNTHETIC RESIN BOTTLES WITH BASE CUPS

BACKGROUND OF THE INVENTION

The present invention relates to a method of stretching and blow molding of a synthetic resin bottle with a base cup and, more particularly, to a method of molding a synthetic resin bottle with a base cup for use in soft drinks, for example, by stretching a parison with a bottom and blowing air thereinto.

There is known a method in which a parison with a bottom is stretched to the bottom surface of a base cup which has been placed on the bottom mold of a blow mold; and air is blown thereinto to mold a bottle and, at the same time, the base cup is allowed to adhere to the bottom of the bottle. This method, however, is not practical in the preparation of bottles with base cups because most of the base cups drop off during use since they are merely allowed to adhere to the bottle.

SUMMARY OF THE INVENTION

Therefore, the object of the present invention is to provide a method of manufacturing a bottle with a base cup, this method being capable of alleviating the drawbacks and difficulties of conventional methods.

Another object of the present invention is to provide a method of manufacturing a bottle with a base cup which is tightly attached thereto so as not to drop off easily.

A further object of the present invention is to provide a method of manufacturing a bottle with a base cup by molding a sprue formed at the time of injection molding on the bottom surface of a parison with a bottom, into a rivet at the time of blow molding of bottle, and securing the base cup to the bottom of the bottle therethrough.

BRIEF DESCRIPTION OF THE DRAWINGS

The drawings illustrate a method of stretching and blow molding a synthetic resin bottle with a base cup in accordance with an embodiment of the present invention wherein.

DETAILED DESCRIPTION OF THE INVENTION

The present invention will be described hereinbelow in more detail by referring to the attached drawings.

Figure 1:
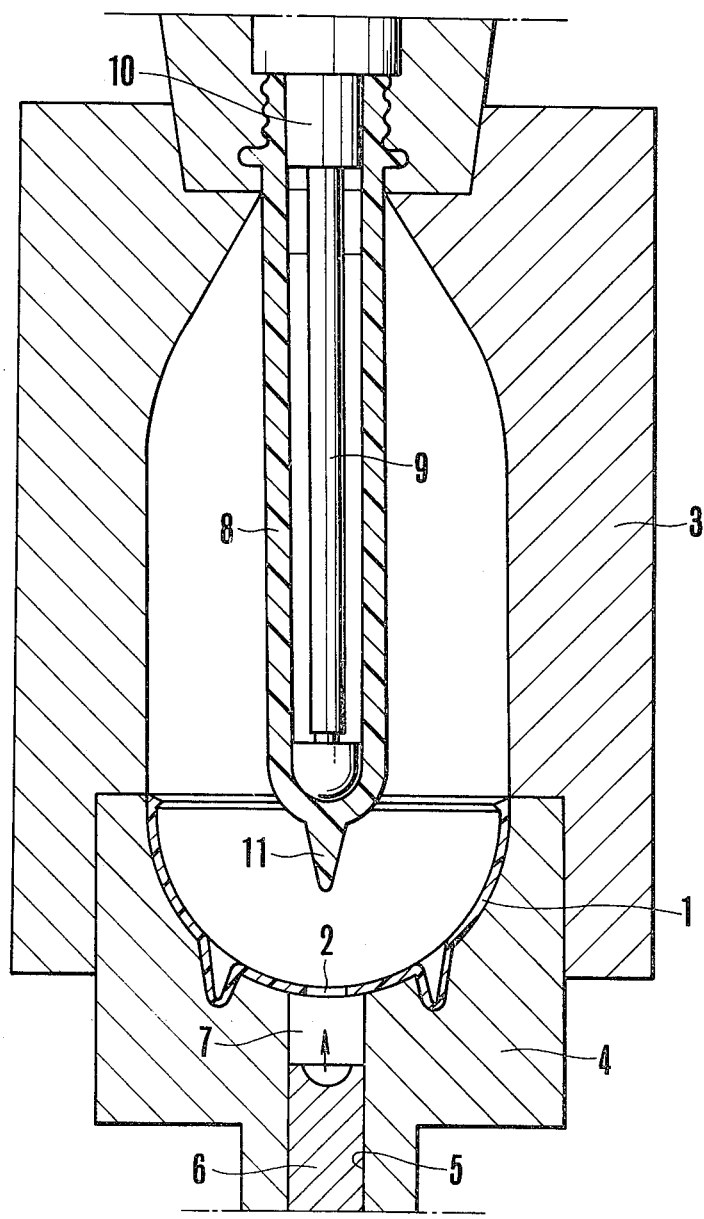
FIG. 1 is a vertical sectional view illustrating the embodiment at the moment of closure of a mold.
Figure 2:
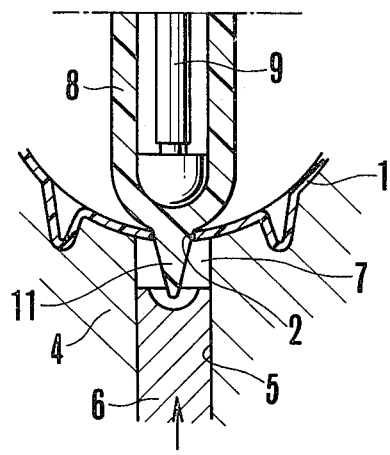
FIG. 2 is a vertical sectional view illustrating the embodiment at the time of molding.

Referring to FIGS. 1 and 2, a base cup 1 in the form of a bowl is provided at the central portion of its bottom with a hole 2 of predetermined diameter. When the base cup 1 is inserted and mounted in a cavity of a vertically movable bottom mold 4 of a blow mold 3, which is then inserted into the blow mold 3.

The bottom mold 4 is provided at its central portion with a guide hole 5 of a diameter larger than that of the hole 2. In the guide hole 5 is disposed a pressing jig 6 for crushing having at its upper end a cavity in such a manner that a space 7 for the insertion of a sprue is left to allow the vertical movement of the jig 6. Accordingly, the hole 2 of the base cup 1 mounted in the bottom mold 4 is positioned above the space 7.

When a parison 8 with a bottom is mounted at the central position of the blow mold 3, a blow core 10 having a stretching rod 9 inside is inserted into the parison 8 with a bottom and the mold is closed. The parison 8 with a bottom has a sprue 11 formed at its bottom outer surface so as to have a predetermined length and correspond to the hole 2 on the base cup.

When the mold is completely closed, the stretching rod 9 is extended to stretch the parison 8 with a bottom to the bottom surface of the base cup so as to allow the sprue 11 to be inserted through the hole 2 and to position most of the sprue 11 in the space 7. After the insertion of the sprue 11 in the space 7, the pressing jig 6 moves upwardly to crush the sprue 11 toward the back surface of the base cup bottom in cooperation with the stretching rod 9 to form a rivet 13. Since the parison 8 with a bottom and the sprue 11 are adjusted in a heating stage, the crushing of the sprue 11 can be carried out with ease so that the sprue may be welded to the base cup 1.

While the sprue 11 is crushed, air is blown under pressure into the parison 8 with a bottom to blow it to the point where the bottom thereof presses and adheres to the inner surface of the base cup 1, thereby forming a bottle 12.

This method allows the base cup 1 to be secured to the bottom surface of the bottle 12 through the rivet 13 formed by crushing the sprue and forms the bottom surface of the bottle integral with the inner surface of the base cup by pressing them toward each other so that no space is left therebetween. This joint between the base cup and the bottle cannot be broken easily by inner pressure produced at the time of filling the bottle or even by outer pressure applied thereto.

Figure 3:
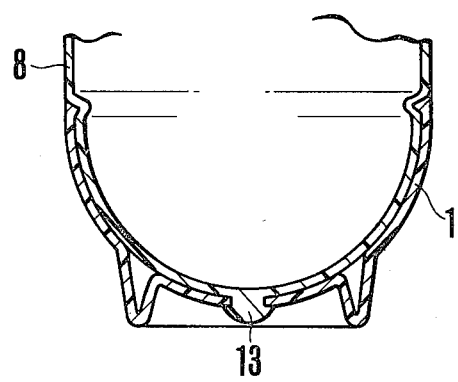
FIG. 3 is a vertical sectional view illustrating the bottom portion of a bottle manufactured by the method in accordance with the present invention.

This joint may be reinforced by forming a projection 1a at the open edge of the base cup 1 as shown in FIG. 3.

In the method in accordance with the present invention, the base cup is fixed securely to the bottom of the bottle by means of the formed rivet. The base cup and the bottle are joined securely by pressing the bottom surface of the bottle to the inner surface of the base cup so that no space is left therebetween. This differs from the case of mere adherence between the base cup and the bottom surface of the bottle. The bottle thus produced looks as if it is formed integrally with the base cup, giving it a favorable appearance. This method also has the advantage of utilizing a sprue which would otherwise be discarded in a conventional method, so that the injection molding of a parison with a bottom is made easier. 9n

What is claimed is:

1. A method of manufacturing a synthetic resin bottle with a base cup by stretching and blow molding comprising:
   (1) inserting and mounting the base cup in a bottom mold of a blow mold, said base cup having a hole of predetermined size at the central portion of the bottom thereof;
   (2) stretching a parison with a bottom having a sprue at the bottom surface thereof to the bottom surface of the base cup by means of a stretching rod after closure of the mold, said sprue being so positioned to correspond to the central portion of the blow mold, thereby inserting the sprue into the hole in the bottom of the base cup;

(3) pressing and crushing said sprue by means of a pressing jig mounted in a hole in the central portion of the bottom mold to form a rivet for securely fixing the bottom of the parison to the base cup; and (4) blowing air into the parison with a bottom to press the bottom surface of the parison with a bottom against the inner surface of the base cup and to allow the bottom surface of the parison with a bottom to adhere securely to the inner surface of the base cup.

2. A method of manufacturing a synthetic resin bottle with a base cup as claimed in claim 1, wherein the base cup is provided with an annular projection at an upper opening edge portion.

* * * * *